United States Patent [19]
Gupta et al.

[11] Patent Number: 5,824,767
[45] Date of Patent: Oct. 20, 1998

[54] POLY(ARYLENE SULFIDE) COMPOSITIONS HAVING IMPROVED PROCESSABILITY

[75] Inventors: Balaram B. Gupta, Corpus Christi, Tex.; Andrew B. Auerbach, Livingston, N.J.; Barrie L. Davies, Waxhaw, N.C.

[73] Assignee: Hoechst Celanese Corporation, Warren, N.J.

[21] Appl. No.: 677,671

[22] Filed: Jul. 8, 1996

[51] Int. Cl.$^6$ .......................... C08G 75/14; C08L 81/04; C08K 3/22

[52] U.S. Cl. .......................... 528/387; 528/373; 528/381; 528/388; 524/433; 524/436; 524/609; 264/164; 264/165; 264/176.1; 264/177.13; 264/178 F; 525/357

[58] Field of Search .................................... 524/433, 436, 524/609; 525/357; 264/178 F, 164, 165, 176.1, 177.13; 528/387, 381, 388, 373

[56] References Cited

U.S. PATENT DOCUMENTS

| | | | |
|---|---|---|---|
| 3,985,661 | 10/1976 | Ikeda et al. | 252/12 |
| 4,373,091 | 2/1983 | Edmonds, Jr. | 528/481 |
| 4,405,745 | 9/1983 | Mathis et al. | 524/429 |
| 4,418,029 | 11/1983 | Reed et al. | 524/400 |
| 4,535,117 | 8/1985 | Mathis et al. | 524/429 |
| 4,588,789 | 5/1986 | Scoggins et al. | 525/537 |
| 4,898,904 | 2/1990 | Yu et al. | 524/399 |
| 4,960,813 | 10/1990 | Wadhwa et al. | 524/311 |
| 5,008,316 | 4/1991 | Wadhwa et al. | 524/230 |
| 5,209,855 | 5/1993 | Solaas et al. | 210/743 |
| 5,252,633 | 10/1993 | Ohara et al. | 523/210 |
| 5,415,791 | 5/1995 | Chou et al. | 252/12 |

FOREIGN PATENT DOCUMENTS 0 144 987  6/1985  European Pat. Off. ........ C08L 81/02

*Primary Examiner*—P. Hampton-Hightower
*Attorney, Agent, or Firm*—Karen E. Klumas

[57] ABSTRACT

A process for improving the processability of poly(arylene sulfide) in melt spinning operations by treatment with a barium-containing compound and, optionally, a lubricant is disclosed.

38 Claims, No Drawings

POLY(ARYLENE SULFIDE) COMPOSITIONS HAVING IMPROVED PROCESSABILITY

BACKGROUND OF THE INVENTION

1. Field of the Invention

This invention relates to poly(arylene sulfide) compositions having improved processability in melt spinning, as well as other melt extrusion operations. More particularly, this invention relates to the use of a barium-containing compound and, optionally, a lubricant to improve the processability of poly(arylene sulfide) in melt spinning applications, as well as to melt spun fibers and filaments so produced. This invention further relates to a process wherein the adhesion of poly(arylene sulfide) to metal surfaces is reduced by treatment with a barium-containing hydroxide and/or salt and a lubricant as well as to poly(arylene sulfide) compositions so treated.

2. Description of the Prior Art

Undesirable adhesion to metal surfaces is a problem in applications where polymer-metal contact is ancillary to polymer processing, for example, injection molding, melt-spinning, thermoforming and the like. The extent to which a polymer will adhere to a metal surface is widely variable and depends on factors which include the chemical composition of the polymer as well as polymerization and post-polymerization conditions and treatments employed during polymer manufacture. In the melt-spinning of poly(arylene sulfide) polymers a variety of adhesion-related problems have been observed. These problems include, for example, internal build-up of polymer in spinneret capillaries causing filament to extrude at an angle or "knee" to capillary openings, leading to undue stress and breakage of the spun filaments as well as capillary blockage. Another adhesion-related problem is the build-up of polymer on spinneret surfaces resulting from both initial filament extrusion and "lick back" from filament breaks. These adhesion-related problems lead to premature spin pack failure and equipment down time to replace spent spinneret packs, and can limit the use of poly(arylene sulfide) in certain melt spinning operations.

A variety of lubricants and mold release agents, such as, for example, fatty acid esters and amides, have been suggested as additives to reduce polymer adhesion to metal surfaces. These materials function to increase the polymer lubricity at its point of contact with a surface. In the case of poly(arylene sulfides), conventional lubricants alone have not been found to significantly reduce the adhesion problems associated with melt-spinning operations.

Other materials have been suggested as additives for poly(arylene sulfide) resins. U.S. Pat. No. 4,898,904, for example, discloses the use of alkali metals of Group IA; alkaline earth metals of Group IIA and Group IIB; and organic compounds such as carboxylic acids as additives to alter the melt flow rate and reduce the melt crystallization temperature of poly(arylene sulfide) resins. U.S. Pat. No. 4,588,789 discloses a water wash process of impregnating (polyarylene sulfide) with multivalent ions as a means of increasing polymer melt viscosity and reducing melt crystallization temperature. Neither patent, however, addresses what effect, if any, the disclosed additives or processes have on either the adhesion of poly(arylene sulfide) to metal surfaces or the processability of poly(arylene sulfide) in melt spinning operations.

Accordingly, there remains a need for a means of reducing undesirable metal surface adhesion of poly(arylene sulfide) as well as a method to improve the processability of poly(arylene sulfide) in melt spinning operations.

SUMMARY OF THE INVENTION

It has now been found that the processability of poly(arylene sulfide) in melt spinning operations is improved by treatments with a source of ionic barium, in particular, a barium containing hydroxide and/or salt. In fact, barium treatment has been observed to improve the melt strength of poly(arylene sulfide) in the production of fine denier fibers. This improvement in melt strength translates to the ability to melt spin lower molecular weight polymer, which can be a significant benefit from a cost and processing perspective.

It has also been found that treatment with a barium-containing hydroxide and/or salt and a lubricant is effective in reducing the adhesion of poly(phenylene sulfide) to metal surfaces. In melt spinning applications, this treatment lessens the tendency of poly(arylene sulfide) to adhere to spinneret surfaces and reduces capillary clogging, thereby extending spinpack life. Moreover, the reduction in metal surface adhesion is achieved without deleteriously affecting the internal binding force or cohesive character of the poly(arylene sulfide) in the melt.

The degree to which metal surface adhesion is reduced is greater in the case of poly(arylene sulfide) treated with a barium hydroxide and/or salt and a lubricant than that of a poly(arylene sulfide) treated with either the barium compound or lubricant alone. Thus, in another embodiment this invention relates to a process for reducing the adhesion of poly(arylene sulfide) to metal surfaces by treatment of the poly(arylene sulfide) with at least one barium-containing compound selected from the group consisting of barium-containing hydroxides and salts and at least one lubricant. This invention further relates to poly(arylene sulfide) so treated as well as to molded articles, fibers and films produced from same.

In yet another embodiment this invention relates to a process for producing a poly(arylene sulfide) fiber which comprises the steps of:

(a) melt extruding a fiber-forming poly(arylene sulfide) through a spinneret into a spinning column;

(b) cooling the resulting filaments with a quenching gas; and (c) collecting the cooled filaments from the spinning column, wherein said poly(arylene sulfide) has been treated with at least one compound selected from the group consisting of barium-containing hydroxides and salts.

DETAILED DESCRIPTION OF THE INVENTION

The reactions and side reactions which take place during the production of poly(arylene sulfides) are numerous and complex. Without wishing to be bound by theory, it is believed that acid and thiol end groups produced during polymerization tend to promote adhesion of the poly(arylene sulfide) polymer to metal surfaces. It is theorized that treatment with suitable barium-containing compounds converts these end groups to salts which, in the case of the acid end groups, are decarboxylated during melt compounding or processing. It is also believed that the reaction or complexing of barium compounds with acid end groups or other functionality may promote further reaction of polymeric species, which can increase the melt viscosity and reduce the melt crystallization temperature of the polymer. The precise mechanism by which the benefits of this invention are achieved is not known; however, it is believed that minimizing the functionality associated with surface adhesion enables a lubricant to be effectively used to further reduce the adhesion of polymer to metal surfaces.

Treatment of the poly(arylene sulfide) with the barium-containing compound can be accomplished by a variety of techniques, such as, for example, melt blending or ion washing. The particular form of the barium compound used will depend upon the treatment technique selected. In the case of melt blending, it is desirable to use a barium compound which is fluid in the melt and a strong enough base to interact with reactive end groups. Additionally, compounds which remain as solids during melt blending are usually less effective in this treatment technique, particularly at low additive levels, due to their low dispersability in the melt. For example, compounds such as barium oxide and barium hydroxide monohydrate, which ordinarily remain in solid form in the melt, are less easily mixed and homogenized with the poly(arylene sulfide) than is barium hydroxide octahydrate. It will be appreciated by those skilled in the art that when melt blending barium hydroxide octahydrate, care must be taken not to process the additive under conditions which can cause dehydration before the additive is uniformly dispersed in the poly(arylene sulfide).

Melt blends are generally prepared by extrusion of the poly(arylene sulfide) and metal compound under conditions of shear and elevated temperature in an extruder or other mixing apparatus. Extrusion temperatures typically extend to temperatures of up to about to 340° C., preferably from about 280° C. to about 340° C., with blends containing higher viscosity poly(arylene sulfide) being extruded at higher temperatures within this range than blends containing lower viscosity poly(arylene sulfide). Depending upon the particular components present and their relative amounts, the use of melt temperatures in excess of 340° C. can result in deterioration of the physical properties of the resultant blends. For processing convenience, the polyarylene sulfide and barium compound may be tumble-blended or otherwise pre-mixed prior to melt extrusion.

In the case of ion washing, the barium compound must be a salt that is capable of being solubilized in the wash medium, typically water. It is also recommended that the anion of such salts not produce undesirable by-products during the washing treatment or subsequent processing of the poly(arylene sulfide). Salts such as, for example, barium acetate, barium nitrate, barium nitrite, barium sulfate and barium citrate, are recommended when the wash medium is water, with barium acetate being preferred.

Ion washing is carried out by contacting the poly(arylene sulfide), typically in powder or reactor chip form, with the wash medium in which the barium salt has been dissolved, at a temperature and for a time sufficient for the barium ions to react or complex with the poly(arylene sulfide). It will be appreciated that washes at higher temperatures may be conducted in shorter time periods. It will also be appreciated that the relative amount of wash medium and polymer and the amount and solubility of the barium compound in the wash medium will also affect the time for the wash. In general, the poly(arylene sulfide) is combined with the barium-containing wash medium to form a slurry which contains up to about 60 weight percent of polymer. When water is the wash medium, it is generally recommended that the polymer be treated with an aqueous solution containing from 0.5 to 5.0% by weight of barium at temperatures of from about 50 to about 120° C. for a period of about 30 to about 10 hours, with temperatures of from about 80 to about 100° C. being of particular interest. Multiple wash steps may be used if desired. Further description of ion washing techniques are set forth in U.S. Pat. No. 4,588,789 incorporated herein by reference.

The barium-containing compound with which the poly (arylene sulfide) is treated should be present in an amount sufficient to react with or complex undesirable functional groups. The benefits of this invention are generally observed when the treatment provides polymer having a barium content of from about 0.05 to about 2.0 percent by weight, preferably from about 0.05 to about 0.5 percent by weight. In melt spinning operations to produce low denier filament it is of particular interest to provide the polymer with a barium content of from about 0.1 to about 0.5 percent by weight. As the amount of such groups may vary depending upon the conditions under which the polymer was made, the optimum amount of barium used is subject to some variation and may be determined, for example, by using inductively coupled argon plasma emission spectroscopy or other analytical means to calculate functional end group levels and adjusting the barium content accordingly.

It is generally recommended that the poly(arylene sulfide) which has been treated with a barium compound as set forth above be heated under conditions sufficient to remove undesirable off-gases prior to processing. In the case of poly(arylene sulfide) into which the additive is incorporated in the melt, this will be accomplished during melt blending. In the case of poly(arylene sulfide) wherein the barium is added by ion wash techniques, it may be desirable to heat treat the polymer prior to processing. Heating of ion washed polymer can also be accomplished during incorporation of the lubricant component.

Lubricants used in the practice of this invention must be able to withstand the processing conditions of poly(arylene sulfide) (typically from about 290° C. to about 320° C.) without substantial decomposition. Suitable lubricants belong to a class commonly known as external lubricants for their ability to migrate to the surface of the polymer melt during processing. Exemplary of such lubricants are fatty acids esters, the salts thereof, esters, fatty acid amides, organic phosphate esters, and hydrocarbon waxes of the type commonly used as lubricants in the processing of engineering plastic materials, including mixtures thereof. Lubricants suitable for the practice of this invention are well known in the art and are commercially available from numerous suppliers.

Fatty acids of interest in the practice of this invention are compounds having a backbone carbon chain of from about 12 to about 60 carbon atoms. Fatty acids include, for example, saturated and unsaturated fatty acids such as, for example, myristic acid, palmitic acid, stearic acid, arachic acid, montanic acid, octadecinic acid, parinric acid, and the like. Esters suitable for use herein include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and the like. Also of interest in the practice of this invention are the metal salts of fatty acids such as, for example, calcium stearate, zinc stearate, magnesium stearate, and the like; hydrocarbon waxes, including paraffin waxes, polyolefin and oxidized polyolefin waxes, and microcrystalline waxes.

Stearic acid salts, esters, and amides, for example, pentaerythritol tetrastearate, calcium stearate, N,N'-ethylenebisstearamide, and the like, are of particular interest in the practice of this invention.

The lubricant is present in the polymer in an amount of from about 0.05 to about 1.5 percent by weight, with amounts of from about 0.1 to about 0.5 percent by weight being of particular interest. The lubricant is typically incorporated in the subject compositions by any means which brings the lubricant into intimate contact with the poly (arylene sulfide) resin. It should be appreciated that, if desired, the lubricant component of the subject compositions can be extruded with the barium compound or incorporated into the subject resins in one or more separate compounding steps.

The poly(arylene sulfide) ("PAS") component of this invention is a polymer consisting essentially of repeating units of the formula:

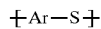

wherein Ar for an individual repeating unit is a divalent radical selected from the group consisting of:

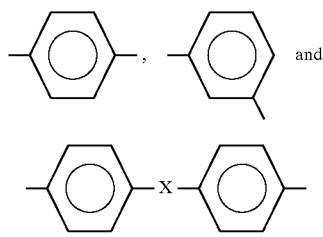

wherein X is a divalent radical selected from the group consisting of $-SO_2-$, $-C(O)-$, $-O-$, $-C_aH_{2a}-$, and $-C(CH_3)_2-$ wherein a is an integer having a value of 0 to 3. Additionally, the aromatic rings of the individual radicals Ar may be optionally substituted by 1 to 3 substituents selected from the group consisting of alkyl groups having up to 4 carbon atoms, and fluorine, chlorine and bromine radicals. For purposes of this invention unsubstituted polymers are of particular interest. Mixtures of two or more different poly(arylene sulfides) are also suitable for use herein.

The poly(arylene sulfides) used herein and their method of preparation are well-known in the art and are described, for example, in U.S. Pat. Nos. 3,354,127; 4,645,826; and 4,645,826, all of which are incorporated herein by reference. In general, such poly(arylene sulfides) are prepared by the reaction of an alkali metal sulfide and a dihalo-aromatic compound. Depending upon the particular method of preparation, the poly(arylene sulfide) may exist as random or block homopolymers or copolymers.

The poly(arylene sulfide) may be a linear or branched polymer having a melt viscosity of from about 30 to about 800 Pa.sec., preferably from about 50 to about 500 Pa.sec. at 1,200 sec$^{-1}$ and 310° C. Substantially linear polymers are of particular interest. The viscosity of the polymer will depend in part on its molecular weight distribution, polymer linearity and the extent to which it is crosslinked ("cured"). Both uncured or partially cured polymers are suitable for use herein. Curing of the poly(arylene sulfide) may be accomplished by thermal and/or solvent treatments such as are known in the art.

Poly(arylene sulfides) of particular interest include high viscosity polymers as disclosed in U.S. Pat. No. 4,645,826, incorporated herein by reference, having viscosities which are within the useful range described above. As disclosed therein, a linear PAS can be readily produced by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases, i.e., a high viscosity phase (polymer solution phase) and a low viscosity phase (solvent phase), and carrying out the reaction under such a state.

The two-phase separated polymerization comprises dissolving a low viscosity arylene sulfide prepolymer, in a poor solvent, i.e., water, under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylene sulfide prepolymer into a high molecular weight polymer, then separating the polymer from the polymerization system and purifying the polymer after neutralization.

The process for production of a high to ultra-high molecular weight PAS according to U.S. Pat. No. 4,645,826 comprises, in general, forming PAS molecules through bonding between an alkali metal sulfide and a dihaloaromatic compound and/or converting the PAS molecules into a high molecular weight polymer. PPS having melt viscosities of at least 1,000 poise at 1,200 sec$^{-1}$ can be produced by the process as disclosed therein.

The starting materials for producing the prepolymer comprise an alkali metal sulfide, a dihalo-aromatic compound and a polymerization solvent. The alkali metal sulfide includes lithium sulfide, sodium sulfide, potassium sulfide, rubidium sulfide, cesium sulfide and mixtures thereof. These alkali metal sulfides can be used as hydrates or aqueous mixtures, or in anhydrous forms. Among these alkali sulfides, sodium sulfide is the least expensive and is commercially preferred. It is also possible to use a small amount of an alkali metal hydroxide in combination therewith in order to neutralize an acidic salt (e.g., alkali metal disulfides and alkali metal bicarbonates) which may sometimes occur in minute amount in the alkali metal sulfide.

The dihalo-aromatic compound used includes any of the dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy-2,5-dichlorobenzene, 4,4'-dichlorobiphenyl-3,5-dichlorobenzoic acid, p,p'-dichlorodiphenylether, p,p'-dichlorodiphenylsulfone, p,p'-dichlorodiphenylsulfoxide, p,p'-dichlorodiphenyl-ketone, and the like. Among these, those composed mainly of paradihalobenzene, typically p-dichlorobenzene, are especially preferred.

By appropriate selection and combination of dihaloaromatic compounds, a random or block copolymer containing two or more different reaction units can be obtained. For example, when employing p-dichlorobenzene in combination with m-dichlorobenzene or p,p'-dichlorodiphenylsulfone, a random or block copolymer containing:

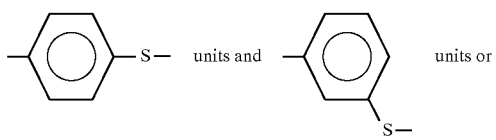

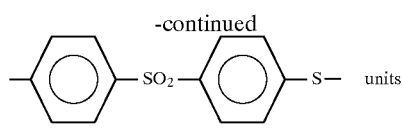
—⟨◯⟩—SO₂—⟨◯⟩—S— units can be obtained. Further, a small amount of a polyhaloaromatic compound (e.g., trichlorobenzene) within the range which may provide some cross-linking but not substantially impair linearity may also be employed in combination, but no such compound is ordinarily required.

An organic amide solvent which is used in the polymerization step can be used for forming the prepolymer and can be selected from N-methylpyrrolidone (NMP); N-ethylpyrrolidone; N,N'-dimethylformamide; N,N'-dimethylacetamide; N-methylcaprolactam; tetramethylurea; hexamethylphosphorotriamide; and mixtures thereof. Among these, N-methylpyrrolidone is particularly preferred from viewpoints such as chemical stability and the ability to produce readily a high molecular weight polymer. The organic amide as the polymerization solvent is desirably an aprotic compound. In the polymerization step for forming an ultra-high molecular linear polymer from the prepolymer, the above organic amide can of course be used. Otherwise, it is also possible to employ, for example, aromatic hydrocarbons ($C_6$–$C_{30}$), aliphatic hydrocarbons ($C_6$–$C_{30}$), ethers ($C_6$–$C_{30}$), ketones ($C_5$–$C_{30}$), pyridine or quinoline or derivatives of these ($C_5$–$C_{30}$), and mixtures thereof as such or as mixtures with organic amides.

In practicing the process, first, an alkali metal sulfide and a dihalo-aromatic compound are added into an organic solvent, desirably under an inert gas atmosphere, and the temperature is elevated to a desired temperature at which the reaction is carried out. Here, if the water content in the alkali metal sulfide is less than the desired content, the necessary amount of water is added for supplementation.

The preliminary polymerization is preferably conducted at a temperature in the range of from 160° to 260° C., particularly from 180° to 235° C. At a temperature lower than 160° C., the reaction rate may be extremely slow, while at a temperature over 260° C., the PAS formed is liable to be decomposed to produce only a PAS with extremely low melt viscosity.

The end point of the preliminary polymerization step and the timing of turning from the preliminary polymerization to the two-phase separate polymerization, is preferably the point when the conversion of the dihalo-aromatic compound has reached 70 mole % to 98 mole %.

At the point of turning from the preliminary polymerization to the two-phase separated polymerization, the melt viscosity of the PAS is preferably in the range of from 0.5 to 30 Pa.sec. (at 310° C. and a shearing rate of 200 $sec^{-1}$). The range of from 1 Pa.sec. to 20 Pa.sec. is more suited for obtaining a PAS of a high polymerization. With a viscosity less than 0.5 Pa.sec., formation of two-phase separation is insufficient, whereby decomposition of the polymerization system or lowering of the reaction rate will readily occur. With a viscosity over 30 Pa.sec., harmful substances which will promote polymer cleavage will be accumulated in greater amount, whereby a lowering in polymer yield and decomposition of the polymer system will undesirably be caused.

The polymerization process as described in U.S. Pat. No. 4,645,826 is applicable for not only homopolymerization or random copolymerization but also for block copolymerization. For example, a purified p-phenylene prepolymer and a purified m-phenylene prepolymer can be dispersed in the same polymerization vessel to carry out the two-phase separated polymerization step, whereby a p-phenylenesulfide-m-phenylene sulfide block copolymer can readily be obtained.

Because of its availability and desirable properties such as high chemical resistance, nonflammability, and high strength and hardness, poly(phenylene sulfide) is the presently preferred poly(arylene sulfide). Poly(phenylene sulfide) is available from a variety of sources including Hoechst Celanese Corporation, Phillips Petroleum Corporation, and Bayer Aktiengesellschaft.

The compositions of this invention are useful in the production of a variety of molded and extruded articles, and are particularly well suited to fiber and monofilament applications. Compositions which exhibit a relatively high degree of ductility in the melt are useful in the production of film, sheet, fiber and monofilament. Additionally, the compositions of this invention may be used as an encapsulant or coating.

Depending on the objects being formed and the processing techniques employed, the compositions of this invention may further comprise one or more optional additives such as, for example, fillers, antioxidants, heat stabilizers, ultraviolet stabilizers, mold release agents, plasticizers, flame retardants, pigments, and the like. The total amount of all such optional additives, exclusive of filler, typically will not exceed about 5 percent of the total weight of the composition and oftentimes will not exceed about 2 percent of the total weight of the composition. It should be noted that filler, when present, will typically account for up to about 65 percent of the compositions' total weight. The optional additives may be incorporated by a variety of techniques which combine the additives with the melt blend in a substantially uniform manner; extrusion compounding being preferred.

EXAMPLES

In the Examples that follow, the following abbreviations are used:

PPSI—Polyarylene sulfide having a reported average melt viscosity of 140 Pa.sec. at a temperature of 310° C. and a shear rate of 1200 $sec^{-1}$ available from Hoechst Celanese Corporation.

PPSII—Polyarylene sulfide having a reported average melt viscosity of 55 Pa.sec. at 1200 $sec^{-1}$ available from Hoechst Celanese Corporation.

AXEL INT 38H—A mixture of crosslinked polyethylene waxes and fatty acids available from Axel Plastics Research Lab. Inc.

PETS—Pentaerythritol tetrastearate.

Weston 618—Distearyl pentaerythritol diphosphite available from General Electric Co.

Acrawax C—N,N-ethylene bisstearamide from Lonza Inc.

PE Wax—Polyethylene wax from Allied-Signal, Inc., sold under the trade designation AC629A.

As reported in the following Examples, Lap Shear Adhesion Force was determined by the following procedure:

Lap Shear Adhesion Force Procedure

A 22.86 cm×22.86 cm×0.95 cm mating male and female castellated mold was made from hard aluminum in which five parallel grooves, 2.54 cm wide ×0.25 cm deep and 22.86 cm long, were machined. Three thermo-couple holes were drilled from one end to the center of the plate to monitor its temperature uniformity. Tests showed this to be within ±2° C. The plates were then hard anodized to give them wear resistance.

Test strips of 26 gauge 316 or 304 stainless steel (2.54 cm×12.70 cm) were cleaned in an ultrasonic bath with a 15% aqueous solution of Oakite Liquid Rust Stripper from Oakite Products, Inc., then rinsed and dried. Immediately before use, the strips were polished with steel wool, rinsed with acetone and dried. Laying the strips at each end of a slot in the female plate gave one square inch of overlap between the test strips at the center of the plate. In order to keep the strips parallel, packing pieces of similar stainless steel (≈7.62 cm long) were placed below the upper test strips, and above the lower test strips polyimide film strips 3 mil thick were placed between the upper and lower packing and test pieces to create a 3 mil gap between the test strips at the point of overlap. The test polymer, either chip or powder, was placed in the overlap region between the metal test strips, the male portion of the mold was mated to its counterpart and the loaded mold was placed in a preheated hydraulic press, lightly loaded until a small pressure showed on the hydraulic pressure gauge, and left for 6 minutes to come to the working temperature. The heated mold was then subjected to 10 tons pressure for 15 minutes at 310° C. On removal from the press the mold was rapidly cooled on a water cooled cooling table, and the bonded strips were tested on a Sintec Model 20 tensile tester. Test conditions were as follows:

440,000 dynes load cell;

manual jaws with grips capable of holding 1.1 million dynes force;

gauge length—12.70 cm;

crosshead speed—0.127 cm/min.; and sample width—2.54 cm.

Unless otherwise indicated, the test was repeated 25 times for a given composition and the peak load for reported as an average of the peak load for the specimens tested. Note that failure at the joint can occur both adhesively (metal to plastic interface) or cohesively (within the plastic). The method of failure can be determined by examination of the joint surface after testing.

Example 1

The compositions identified in Table 1 were compounded by mixing the components in the described proportions and melt blending the resulting mixtures, as indicated, on either a Haake conical twin screw extruder (System 90) or a 30 mm ZSK twin screw extruder to produce an extrudate which was cooled and pelletized. Prior to mixing the poly(phenylene sulfide) and other components were dried overnight at temperatures of 110° C. Extrusion conditions were as follows:

Haake extruder:

melt temperature: 300° to 330° C.;

die temperature: 310° to 330 C.; and screw speed: 50–300 rpm vacuum: none

ZSK extruder:

melt temperature: 310° to 335° C.;

die temperature: 310° to 330 C.; and screw speed: 150 rpm vacuum: ≈635 mmHg

Melt viscosities for the compositions were measured using a Kayeness Rheometer at 310° C. and 1200 sec$^{-1}$. The Lap Shear Adhesion Force of the various compositions was measured using the procedure described below and is reported in Table 1.

TABLE 1

| RUN NUMBER | PPS I (wt %) | NaOH (wt %) | Ba(OH)$_2$.1 H$_2$O (wt %) | Ba(OH)$_2$.8 H$_2$O (wt %) | PETS (wt %) | AXEL INT38H (wt %) | LAP SHEAR ADHESION FORCE ($10^8$ dynes) | VISCOSITY @ 1200 sec$^{-1}$ (Pa · sec.) |
|---|---|---|---|---|---|---|---|---|
| 1[1] | 100.00 | — | — | — | — | — | 4.84 | 144 |
| 2[2] | 100.00 | — | — | — | — | — | 5.23 | — |
| 3[1] | 99.65 | 0.35 | — | — | — | — | 4.84 | 493 |
| 4[1] | 99.30 | 0.35 | — | — | 0.35 | — | 3.16 | 410 |
| 5[1] | 99.65 | — | — | 0.35 | — | — | 3.46 | 133 |
| 6[1] | 99.65 | — | — | 0.35 | — | — | 3.69 | 166 |
| 7[1] | 99.65 | — | — | 0.35 | — | — | 4.72 | 143 |
| 8[1] | 99.65 | — | — | — | 0.35 | — | 4.80 | 145 |
| 9[1] | 99.30 | — | — | 0.35 | 0.35 | — | 1.28 | 155 |
| 10[1] | 99.30 | — | — | 0.35 | 0.35 | — | 1.29 | 169 |
| 11[2] | 99.65 | — | — | — | — | 0.35 | 2.73 | 113 |
| 12[2] | 99.50 | — | — | 0.15 | — | 0.35 | 1.73 | 121 |
| 13[1] | 99.30 | — | — | 0.35 | — | 0.35 | 1.37 | 154 |
| 14[2] | 99.30 | — | — | 0.35 | — | 0.35 | 1.52 | 144 |
| 15[2] | 99.10 | — | — | 0.55 | — | 0.35 | 2.20 | 166 |
| 16[1] | 99.65 | — | 0.35 | — | — | — | 5.74 | 260 |
| 17[2] | 99.79 | — | 0.21 | — | — | — | 4.89 | 141 |
| 18[2] | 99.44 | — | 0.21 | — | — | 0.35 | 2.27 | 142 |

[1]Lap shear adhesion force value for an average of five specimens.
[2]Lap shear adhesion force value for an average of twenty-five specimens.

In the compositions described in Table I, the use of barium hydroxide octahydrate in combination with pentaerythritol stearate or the Axel INT 38H lubricant was shown to reduce Lap Shear Adhesion Force to a greater extent than either the barium hydroxide octahydrate or lubricant alone. Moreover, in the exemplified poly(phenylene sulfide), the combination of barium hydroxide monohydrate and lubricant was shown to be of substantially less effect in reducing Lap Shear Adhesion Force than the combination of barium hydroxide octahydrate and lubricant.

Example 2

Compositions as described in Table 2 were compounded on a Haake twin screw extruder under conditions specified in Example 1 using compositions containing 99.30 weight percent PPSII, 0.35 weight percent barium hydroxide octahydrate and 0.35 weight percent of the indicated lubricant.

TABLE 2

| RUN NUMBER | LUBRICANT | LAP SHEAR ADHESION FORCE ($10^8$ dynes) | VISCOSITY @ 1200 $sec^{-1}$ (Pa.sec.) |
|---|---|---|---|
| 1 | NONE | 2.79 | 52 |
| 2 | SILICONE OIL | 2.40 | 76 |
| 3 | STEARYL EUROCAMIDE | 2.25 | 75 |
| 4 | PE WAX | 1.87 | 78 |
| 5 | ACRAWAX C | 1.33 | 71 |
| 6 | AXEL INT 38H | 1.06 | 71 |
| 7 | CALCIUM STEARATE | 1.04 | 72 |
| 8 | PETS | 0.94 | 60 |
| 9 | STEARIC ACID | 0.10 | 67 |

Example 3

Compositions as described in Table 3 were compounded as described in Example 1 using 70 mm ZSK conditions. The pelletized PPS extrudate was melt spun on a continuous basis using conventional melt spinning techniques. The spinneret used was a 1000 circular hole spinneret with 0.23 mm diameter holes. The melt temperature was about 300° C. and the throughput per hole was 0.559 g/min/hole. The filaments were cooled with quench air at 35° C. and 70% humidity. A spin finish was applied and the filaments were wound at a take-up rate of 777 m/min. The resulting yarn had a denier of 6400.

The spun yarn was irrigated with a dilute aqueous dispersion of drawing lubricant (heated to 85° C.) and stretched by a factor of 2.9 then 1.04 in a two-stage drawing process on a staple fiber draw frame. The drawn yarn was cooled and crimped and the threadline was dried and heat set at 180° C.

The total spin run time and maximum spin pack life obtained for a given composition are provided in Table 3. Maximum spin pack life refers to the maximum time a pack could be used in the run prior to its failure and replacement As indicated by the data in Table 3, treatment of poly (phenylene sulfide) with both barium hydroxide octahydrate and Axel Int 38H lubricant provided a greater spin run time than was obtained when the poly(phenylenesulfide) was treated with the barium hydroxide octahydrate alone.

TABLE 3

| | COMPOSITION | | | | Total Spin Run Time (hrs.) | Maximum Spin Pack Life (hrs.) |
|---|---|---|---|---|---|---|
| Run No. | PPS II (wt %) | Ba(OH)$_2$.8H$_2$O (wt. %) | Axel INT 38H (wt. %) | PETS (wt. %) | Weston 618 (wt. %) | |
| 1 | 100.00 | — | — | — | — | <1[1] | — |
| 2 | 99.65 | 0.35 | — | — | — | 14 | 14 |
| 3 | 99.60 | 0.35 | — | — | 0.05 | 14 | 14 |
| 4 | 99.20 | 0.35 | 0.4 | — | 0.05 | 21[2] | 21 |
| 5 | 99.20 | 0.35 | 0.4 | — | 0.05 | 30 | 30 |

[1]Run 1 could not be successfully spun due to poor threadline strength.
[2]The Total Spin Run Time of Run 4 was limited by the amount of polymer spun. The expectation is that a longer Total Spin Run Time would have been observed, were more polymer available.

Example 4

A more demanding spinning experiment was performed using a procedure similar to that described in Example 3, but using a spinneret having trilobal Y-shaped spinneret holes, were 0.508 mm in overall diameter and had a lobe length of 0.214 mm and a lobe width of 0.102 mm. Throughput per hole was 0.233 g/minute, quench air was 28° C. and take-up speed was 899 m/minute. Total filament thickness was 4550 denier vs 6400 ier in Example 3. Conventional PPS processed very poorly er these conditions.

TABLE 4

| | COMPOSITION | | | | Total Spin Run Time (hrs.) | Maximum Spin Pack Life (hrs.) |
|---|---|---|---|---|---|---|
| Run No. | PPS II (wt %) | Ba(OH)$_2$.8H$_2$O (wt. %) | Axel INT 38H (wt. %) | Weston 618 (wt. %) | | |
| 1 | 100.00 | — | — | — | not spinnable[1] | — |
| 2 | 99.65 | 0.35 | 0.4 | 0.2 | 8 | 8 |
| 3 | 99.60 | 0.75 | 0.4 | 0.05 | 12 | 11 |

[1]Run 1 could not be successfully spun due to poor thread line strength.

Example 5

A test was developed for examining gel formation in an extruded rheometer strand. In this test, the PPS formulations described in Table 5 were melted and held in a conventional rheometer at 350° C. A strand was extruded and collected in five minute intervals. Each strand was then examined for gels. An approximate time to first gel formation could then be determined. Data for these runs are presented in Table 5. It can be seen from the data that the addition of lubricant increased the time that the barium treated polymer could be held in the melt before showing signs of gellation. This is significant since gel formation may disrupt normal processing.

TABLE 5

| | COMPOSITION | | TIME |
|---|---|---|---|
| RUN NUMBER | PPS II (wt. %) | Ba(OH$_2$).8H$_2$O | PETS (wt. %) | TO GEL (min.) |
| 1 | 100.00 | — | — | 25 |
| 2 | 99.65 | 0.35 | — | 5 |
| 3 | 99.30 | 0.35 | 0.35 | 15 |
| 4 | 99.65 | — | 0.35 | 25 |

What is claimed is:

1. A process for improving the processability of poly (arylene sulfide) in melt spinning operations which comprises treating the poly(arylene sulfide) with a source of ionic barium and a lubricant prior to melt spinning.

2. A process according to in claim 1 wherein the poly (arylene sulfide) is treated with at least one barium-containing compound selected from the group consisting of barium-containing hydroxides and salts thereof.

3. A process according to claim 2 wherein the poly (arylene sulfide) is treated with the barium compound by ion washing the poly(arylene sulfide) with an aqueous solution of one or more barium compounds selected from the group consisting of: barium acetate, barium nitrate, barium nitrite, barium sulfate and barium citrate.

4. A process according to claim 3 wherein the barium compound is barium acetate.

5. A process according to claim 3 wherein treatment with the barium compound provides the poly(arylene sulfide) with from about 0.05 to about 2.0 percent by weight of barium.

6. A process as described in claim 5 wherein the poly (arylene sulfide) is polyphenylene sulfide and the lubricant is selected from the group consisting of: fatty acids, the salts thereof, fatty acid esters, fatty alcohol esters, wax esters, glycerol esters, glycol esters, complex esters, fatty acid amides, organic phosphate esters, hydrocarbon waxes, and mixtures thereof.

7. A process for improving the processability of poly (arylene sulfide) in melt spinning operations which comprises treating the poly(arylene sulfide) with at least one melt dispersible barium-containing compound and a lubricant.

8. A process according to claim 7 wherein the barium compound is incorporated into the poly(arylene sulfide) by melt blending.

9. A process according to claim 8 wherein treatment with the barium-containing compound provides the poly(arylene sulfide) with from about 0.05 to about 2.0 percent by weight of barium.

10. A process according to claim 9 wherein the barium-containing compound is barium hydroxide octahydrate.

11. A process according to claim 10 wherein the barium-containing compound provides the poly(arylene sulfide) with from about 0.05 to about 0.5 percent by weight of barium.

12. A process according to claim 11 wherein the poly (arylene sulfide) is a polymer consisting essentially of repeating units of the formula:

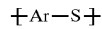

wherein Ar for an individual repeating unit is a divalent radical selected from the group consisting of:

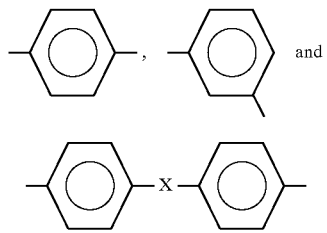

wherein X is a divalent radical selected from the group consisting of $-SO_2-$, $-C(O)-$, $-O-$, $-C_aH_{2a}-$, and $-C(CH_3)_2-$ wherein a is an integer having a value of 0 to 3.

13. A process according to claim 12 wherein the poly (arylene sulfide) is poly(phenylene sulfide) and the lubricant is selected from the group consisting of: fatty acids, the salts thereof, fatty acid esters, fatty alcohol esters, wax esters, glycerol esters, glycol esters, complex esters, fatty acid amides, organic phosphate esters, hydrocarbon waxes, and mixtures thereof.

14. A process according to claim 13 wherein the poly (phenylene sulfide) has a melt viscosity of from about 30 to about 800 Pa. sec. at 1200 sec$^{-1}$ and 310° C.

15. A process according to claim 13 wherein the poly (phenylene sulfide) has a melt viscosity of from about 50 to about 500 Pa. sec. at 1200 sec$^{-1}$ and 310° C.

16. A melt blend poly (arylene sulfide) composition, comprising:
(a) a poly (arylene sulfide);
(b) a melt-dispersible barium compound; and
(c) a lubricant, wherein the composition exhibits improved processability in melt spinning operations.

17. A melt blend according to claim 16 wherein the lubricant is sufficiently soluble in the molten poly(arylene sulfide) to migrate to the surface of the melt during processing.

18. A melt blend according to claim 17 wherein the poly(arylene sulfide) is a polymer consisting essentially of repeating units of the formula:

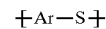

wherein Ar for an individual repeating unit is a divalent radical selected from the group consisting of:

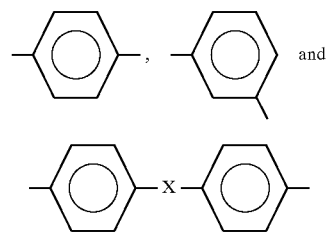

wherein X is a divalent radical selected from the group consisting of $-SO_2-$, $-C(O)-$, $-O-$, $-C_aH_{2a}-$, and $-C(CH_3)_2-$ wherein a is an integer having a value of 0 to 3.

19. A melt blend according to claim 18 wherein the poly(arylene sulfide) is poly(phenylene sulfide).

20. A melt blend according to claim 19 wherein the lubricant is selected from the group consisting of: fatty acids, the salts thereof, fatty acid esters, wax esters, glycerol esters, glycol esters, fatty alcohol esters, complex esters, and mixtures thereof.

21. A melt blend according to claim 20 wherein the barium compound is present in an amount sufficient to provide the polymers with from about 0.05 to about 2.0 percent by weight of barium.

22. A melt blend according to claim 21 wherein the lubricant is present in an amount sufficient to provide the polymer with from about 0.05 to about 1.5 percent by weight of lubricant.

23. A melt blend according to claim 22 wherein the barium compound is barium hydroxide octahydrate.

24. A melt blend according to claim 22 wherein the barium hydroxide octahydrate is present in an amount sufficient to provide the poly(arylene sulfide) with from about 0.05 to about 0.5 percent by weight of barium.

25. A melt blend according to claim 21 wherein the poly(arylene sulfide) has a melt viscosity of from about 50 to about 500 Pa. sec. at 1200 sec$^{-1}$ and 310° C.

26. A melt blend according to claim 22 wherein the lubricant is a fatty acid ester.

27. A melt blend according to claim 24 wherein the lubricant is a polyolefin wax.

28. A melt blend according to claim 21 wherein the lubricant is the salt of a fatty acid.

29. A melt blend according to claim 21 wherein the lubricant is pentaerythritol tetrastearate.

30. A melt blend according to claim 21 wherein the lubricant is calcium stearate.

31. A melt blend according to claim 21 wherein the lubricant is a polyethylene wax.

32. A melt blend according to claim 21 which further comprises at least one additional component selected from the group consisting of fillers, antioxidants, heat stabilizers, ultraviolet stabilizers, mold release agents, plasticizers, flame retardants, and pigments.

33. A process for producing a poly(arylene sulfide) fiber which comprises the steps of:
   (a) melt extruding a fiber-forming poly(arylene sulfide) through a spinneret into a spinning column;
   (b) cooling the resulting filaments with a quenching gas; and
   (c) collecting the cooled filaments from the spinning column, wherein said poly(arylene sulfide) has been treated with a lubricant and at least one compound selected from the group consisting of barium-containing hydroxides and salts.

34. A process according to claim 33 wherein the barium-containing compound is present in an amount sufficient to provide the poly(arylene sulfide) with from about 0.05 to about 2.0 percent by weight of barium.

35. A process according to claim 34 wherein the barium-containing compound is barium hydroxide octahydrate.

36. A process according to claim 35 wherein the poly (arylene sulfide) is poly(phenylene sulfide) having a melt viscosity of from about 5 to about 500 Pa. sec.

37. A process according to claim 36 wherein the lubricant is a lubricant selected from the group consisting of: fatty acids, the salts thereof, fatty acid esters, wax esters, glycerol esters, glycol esters, fatty alcohol esters, complex esters, and mixtures thereof.

38. A poly(arylene sulfide) fiber prepared according to the process of claim 37.

* * * * *